US011853101B2

(12) United States Patent
Oda et al.

(10) Patent No.: US 11,853,101 B2
(45) Date of Patent: Dec. 26, 2023

(54) ADAPTATION APPARATUS

(71) Applicant: NIPPON TELEGRAPH AND TELEPHONE CORPORATION, Tokyo (JP)

(72) Inventors: Takuya Oda, Musashino (JP); Shokei Kobayashi, Musashino (JP); Akira Hirano, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 247 days.

(21) Appl. No.: 17/603,609

(22) PCT Filed: Apr. 7, 2020

(86) PCT No.: PCT/JP2020/015610
§ 371 (c)(1),
(2) Date: Oct. 14, 2021

(87) PCT Pub. No.: WO2020/213467
PCT Pub. Date: Oct. 22, 2020

(65) Prior Publication Data
US 2022/0214889 A1 Jul. 7, 2022

(30) Foreign Application Priority Data
Apr. 17, 2019 (JP) ................. 2019-078764

(51) Int. Cl.
*G06F 9/44* (2018.01)
*G06F 9/54* (2006.01)

(52) U.S. Cl.
CPC ............... *G06F 9/44* (2013.01); *G06F 9/541* (2013.01)

(58) Field of Classification Search
CPC .......... G06F 9/44; G06F 9/541; G06F 9/4416; G06F 9/5027; G06F 9/445;
(Continued)

(56) References Cited

U.S. PATENT DOCUMENTS

2013/0132457 A1* 5/2013 Diwakar ............... G06F 9/5072
709/201
2014/0310401 A1* 10/2014 Thomas .................. H04L 47/70
709/224
(Continued)

OTHER PUBLICATIONS

D. Ceccarelli and Y. Lee, Framework for Abstraction and Control of TE Networks (ACTN), Internet Engineering Task Force (IETF) Request for Comments: 8453, Aug. 2018.
(Continued)

*Primary Examiner* — Raymond N Phan
(74) *Attorney, Agent, or Firm* — Harness, Dickey & Pierce, P.L.C.

(57) ABSTRACT

An adapting device according to an embodiment includes: a first storage unit configured to store correspondence information representing a correspondence relation between processing requested by a higher-level system and a method for implementing the processing in a lower-level system; a conversion unit configured to convert a processing request from the higher-level system to the lower-level system into a processing procedure capable of being implemented in the lower-level system and supply the processing procedure to the lower-level system; and an additional information processing unit configured to generate additional information to be supplied to the lower-level system together with the processing procedure. The conversion unit described above converts the processing request into the processing procedure based on the correspondence information, and the additional information processing unit described above includes, in the additional information, relation information
(Continued)

representing a relationship between the higher-level system that is a request source and the lower-level system that is a request destination.

8 Claims, 13 Drawing Sheets

(58) Field of Classification Search
CPC ............ G06F 9/44536; G06F 9/44552; G06F 9/44589; G06F 9/448; G06F 9/451; G06F 9/452; G06F 9/454
See application file for complete search history.

(56) References Cited

U.S. PATENT DOCUMENTS

| 2015/0186228 A1* | 7/2015 | Kumar | G06F 11/2028 |
| | | | 714/4.12 |
| 2015/0229537 A1* | 8/2015 | Little | H04L 41/508 |
| | | | 709/201 |

OTHER PUBLICATIONS

Luis Velasco et al., An Architecture to Support Autonomic Slice Networking, Journal of Lightwave Technology, vol. 36, No. 1, 2018, pp. 135-141.

* cited by examiner (A)

(B)

(C)

ADAPTATION APPARATUS

CROSS-REFERENCE TO RELATED APPLICATIONS

This application is a 371 U.S. National Phase of International Application No. PCT/JP2020/015610 filed on Apr. 7, 2020, which claims priority to Japanese Application No. 2019-078764 filed on Apr. 17, 2019. The entire disclosures of the above applications are incorporated herein by reference.

TECHNICAL FIELD

The present invention relates to a rule adapting technology between different networks.

BACKGROUND ART

FIG. 12 is a schematic diagram illustrating a relationship between a provider of a network service and a customer using the network service. FIG. 12 illustrates a relation between network providers operating physical networks, a service provider providing a network service using a logical network (slice network) configured on the physical networks, and a customer building his or her network (customer network) using the service of the service provider. FIG. 12 illustrates a case where one service provider configures a logical network using two different physical networks NW-P1 and NW-P2.

Typically, such a relationship is called a business to business to customer (B2B2C) model. Examples of the "customer" described here may include not only a general user (for example, a general consumer using a fixed line or a mobile network), but also a business entity such as a company that builds an intra-company network and operates the intra-company network while changing the configuration in accordance with a use status. Hereinafter, the business entity will be assumed as the "customer" to facilitate description.

FIG. 13 is a schematic diagram illustrating a relationship between operation systems of a customer network, a logical network, and a physical network. Upon requests (1st requirements) from an operation system (orchestrator for NW-C) of the customer network, requests (2nd requirements) and commands relating to settings and the like are delivered in order of a service provider (orchestrator for NW-S), each network provider (orchestrator/SDN-controller for NW-Pn) (here, n=1, 2), and each network device (NE). Then, a network is set and built in the reverse order, and thus a customer can use a service.

At this time, from a viewpoint of security or management, information of a lower-level network is provided to an operation system of a higher-level network with some or all of the information concealed or abstracted. For this reason, a request to the lower-level operation system from the higher-level operation system needs to be converted into a form that is adaptable to the lower-level operation system and a network device (NE) (for example, see Non Patent Literatures 1 and 2). Hereinafter, conversion of a request from a higher-level operation system into a form used for a lower-level operation system will be referred to as "adaptation."

CITATION LIST

Non Patent Literature

Non Patent Literature 1: D. Ceccarelli and Y. Lee, "Framework for Abstraction and Control of Traffic Engineered Networks," IETF doc. RFC8453, August, 2018.

Non Patent Literature 2: L. Velasco et al., "Architecture to Support Autonomic Slice Networking," Journal of Lightwave Technology, vol. 36, no. 1, Jan. 1, 2018.

SUMMARY OF THE INVENTION

Technical Problem

However, in the related art, there are cases where an operation of a network device cannot be dynamically changed mainly due to the following three reasons.

Reason 1: An application (program) is not adapted.
Although a system has been proposed in which adaptation between operation systems of a customer network, a logical network, and physical networks is taken into account, such a system can perform adaptation only on the level of commands (command sets) (for example, see Non Patent Literatures 1 and 2). In order to greatly change operations of a network device and the like dynamically, not only commands but also applications (programs) need to be adapted. However, the adaptation thereof has not been performed.

Reason 2: There are cases in which a lower-level operation system cannot identify a higher-level operation system. In a case where there are a plurality of higher-level operation systems for one lower-level network (device), commands and applications (programs) may be provided from each of the higher-level operation systems. For some of such commands and applications (programs), a higher-level operation system that is a request source cannot be identified, and there are cases in which a response to the request is not performed, and the progress of each request cannot be managed.

Reason 3: A state in which an adapted request is applied (implemented) cannot be identified from a higher-level operation system.
There is a possibility that delivery of an adapted request fails for some reason, or the adapted request is successfully delivered but is not correctly applied (implemented). In the related art, there has been no means for identifying such a fault from the higher-level operation system.

In view of the situations described above, an objective of the present invention is to provide a technology enabling operations of a network device to be dynamically changed.

Means for Solving the Problem

According to one aspect of the present invention, there is provided an adapting device including a first storage unit configured to store correspondence information representing a correspondence relation between processing requested by a higher-level system and a method for implementing the processing in a lower-level system, a conversion unit configured to convert a processing request from the higher-level system to the lower-level system into a processing procedure capable of being implemented in the lower-level system and supply the processing procedure to the lower-level system, and an additional information processing unit configured to generate additional information to be supplied to the lower-level system together with the processing procedure, in which the conversion unit converts the processing request into the processing procedure based on the correspondence information, and the additional information processing unit includes, in the additional information, relation information representing a relationship between the higher-level system that is a request source and the lower-level system that is a request destination.

According to one aspect of the present invention, the adapting device described above further includes a second storage unit configured to store a program for implementing the processing procedure in the lower-level system, in which the conversion unit combines the program corresponding to the processing procedure and supplies the resultant processing procedure to the lower-level system.

According to one aspect of the present invention, the adapting device described above further includes a second storage unit configured to store a program for implementing the processing procedure in the lower-level system, in which the conversion unit supplies the program corresponding to the processing procedure to the lower-level system in accordance with a request from the lower-level system.

According to one aspect of the present invention, the adapting device described above further includes a second storage unit configured to store a program for implementing the processing procedure in the lower-level system, in which the conversion unit combines, among a plurality of the programs corresponding to the processing procedure, only a program that has not been provided to the lower-level system with the processing procedure and supplies the resultant processing procedure to the lower-level system.

According to one aspect of the present invention, in the adapting device described above, the additional information processing unit acquires the relation information based on information representing a correspondence relation between the higher-level system and relation information relating to the higher-level system.

According to one aspect of the present invention, in the adapting device described above, the additional information processing unit acquires the relation information based on a predetermined algorithm using, as an input, information relating to the request.

According to one aspect of the present invention, in the adapting device described above, the algorithm is a hash function using, as an input, identification information of the higher-level system, information relating to a timing of supplying the processing procedure, or information generated based on the identification information and the information relating to the timing.

According to one aspect of the present invention, in the adapting device described above, the additional information includes the relation information and information relating to a timing of supplying the processing procedure.

Effects of the Invention

According to the present invention, operations of a network device can be dynamically changed.

DESCRIPTION OF EMBODIMENTS

First Embodiment

Figure 1:
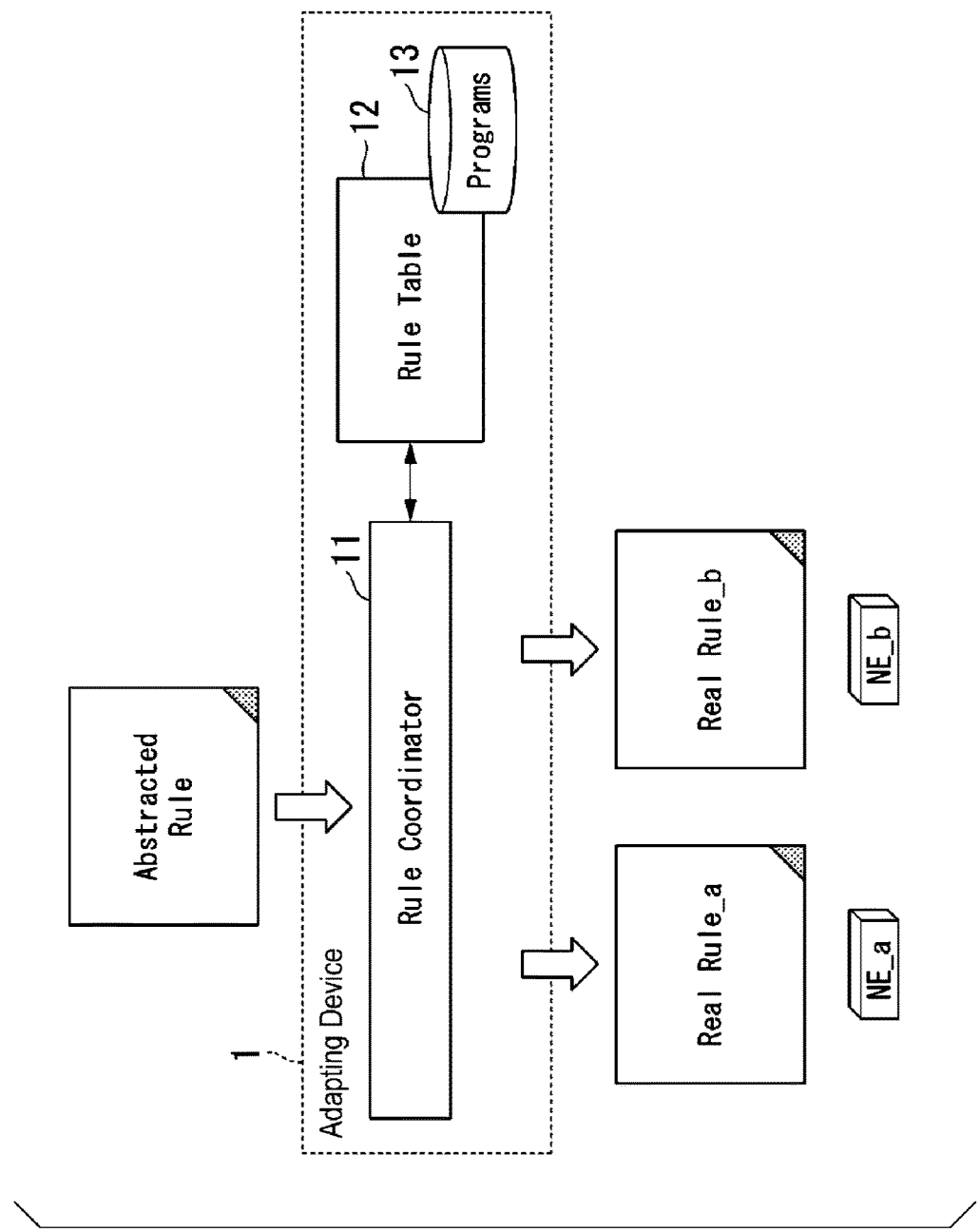
FIG. 1 is a diagram illustrating a specific example of an adapting device according to a first embodiment.

FIG. 1 is a diagram illustrating a specific example of an adapting device according to a first embodiment. The adapting device 1 is a device that adapts a request from a higher-level operation system (hereinafter referred to as a "higher-level system") for a lower-level operation system. Specifically, the adapting device 1 converts a request from the higher-level system that is represented by a more abstracted rule (abstracted rule) into a request adapted for a specific rule (real rule) representing a processing procedure that can be implemented by a lower-level system. As a configuration for implementing such adaptation, for example, the adapting device 1 has the following configuration.

For example, the adapting device 1 includes a central processing unit (CPU), a memory, an auxiliary storage device, and the like interconnected through a bus and executes a program. By executing the program, the adapting device 1 functions as a device that includes an adapting functional unit 11, a conversion table 12, and a database 13. All or some functions of the adapting device 1 may be implemented using hardware such as an application specific integrated circuit (ASIC), a programmable logic device (PLD), or a field programmable gate array (FPGA). The program may be recorded in a computer-readable recording medium. The computer-readable recording medium is, for example, a portable medium such as a flexible disk, a magneto-optical disk, a ROM or a CD-ROM, or a storage device such as a hard disk drive built into a computer system. The program may be transmitted via an electrical communication line.

The adapting functional unit 11 (rule coordinator) has a function of receiving an abstracted rule from the higher-level system as an input, converting the abstracted rule into a specific rule (real rule), and supplying the specific rule to the lower-level system. The adapting functional unit 11 is one example of a conversion unit according to the present invention.

The conversion table 12 (rule table) is information that represents a relationship between an abstracted rule and a specific rule. For example, the conversion table 12 is recorded in a storage device (first storage unit) such as a magnetic hard disk device or a semiconductor storage device. The conversion table 12 is one example of correspondence information according to the present invention.

The database 13 (program) is a database that stores a processing program enabling the lower-level system to execute the specific rule. For example, the database 13 is recorded in a storage device (a second storage unit) such as a magnetic hard disk device or a semiconductor storage device.

In FIG. 1, although two network devices NE_a and NE_b are examples of the lower-level system, a lower-level system in a B2B2C model may be an operation system of a service provider seen from an operation system of a customer or may be an operation system of a network provider seen from the operation system of the service provider. In other words, the network devices NE_a and NE_b may be constituent elements of a logical network or may be constituent elements of a physical network.

Figure 2:
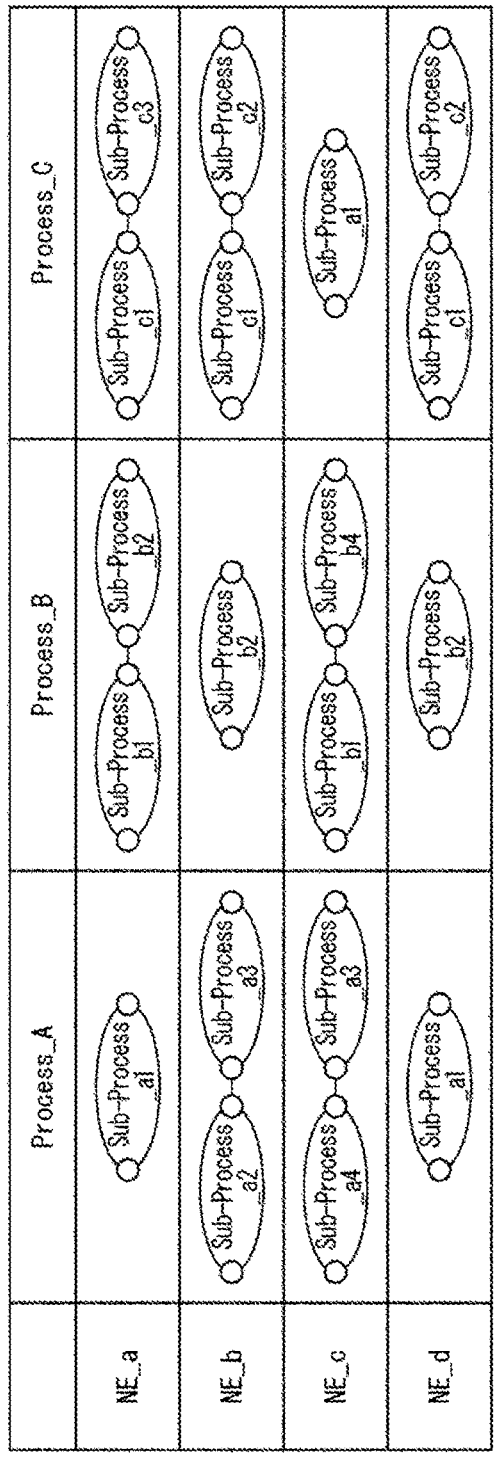
FIG. 2 is a diagram illustrating a specific example of a conversion table and a database according to the first embodiment.
Figure 2:
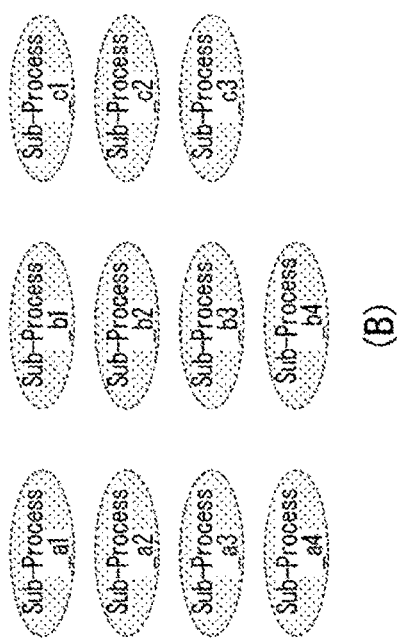

FIG. 2 is a diagram illustrating a specific example of the conversion table 12 and the database 13 according to the first embodiment. FIG. 2(A) illustrates a specific example of the conversion table 12, and FIG. 2(B) illustrates specific examples of programs stored in the database 13.

For example, the conversion table 12, as illustrated in FIG. 2(A), is configured as a table representing a correspondence relation between a constituent element of an abstracted rule (hereinafter referred to as a "process") and a specific rule (hereinafter referred to as a "sub-process") for each type of network device that is the lower-level system. In FIG. 2(A), Process_A to Process_C are illustrated as examples of the processes, and Sub-Process_a1 to a3, Sub-Process_b1 to b4, and Sub-Process_c1 to c3 are illustrated as examples of the sub-processes. Connection of the plurality of sub-processes indicates which sub-process is executed first and which sub-processes is executed next in an execution order. In addition, in FIG. 2(A), NE_a to NE_d are illustrated as examples of the type of network device.

The conversion table 12 defines not sub-processes themselves but a relationship between a process and sub-processes and execution orders of the sub-processes. On the other hand, the database 13 stores sub-programs implementing sub-processes defined in the conversion table 12. For example, in a case where the conversion table 12 is configured as illustrated in FIG. 2(A), at least 11 kinds of sub-programs illustrated in FIG. 2(B) are stored in the database 13 in advance. In FIG. 2(B), each sub-process outlined by a broken line and hatched with dots represents a corresponding sub-program. On the other hand, hereinafter, a sub-process outlined by a solid line and hatched with dots represents a sub-process combined with a corresponding sub-program (for example, FIG. 5).

Figure 3:
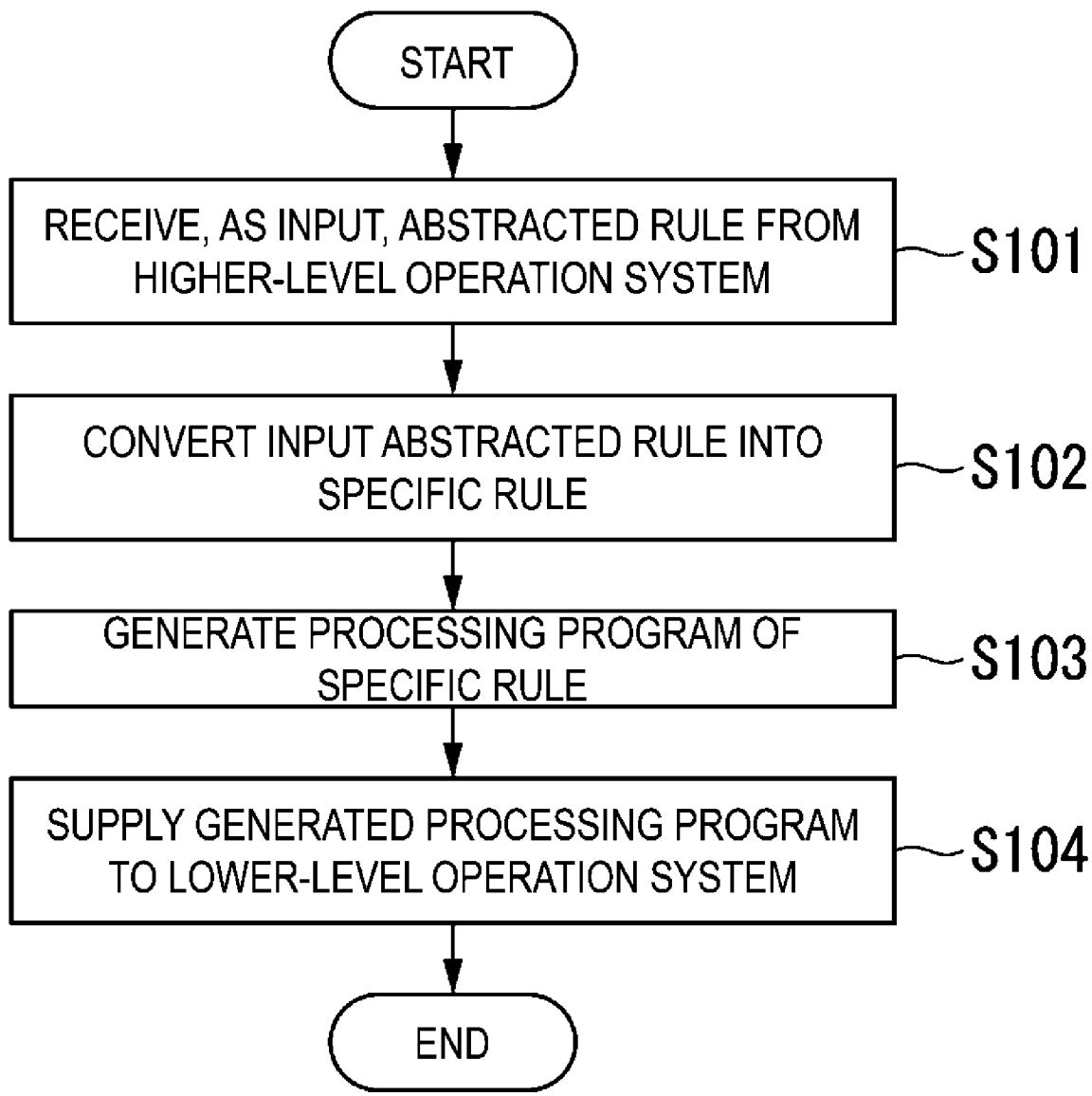
FIG. 3 is a flowchart illustrating a specific example of adapting processing according to the first embodiment.
Figure 4:
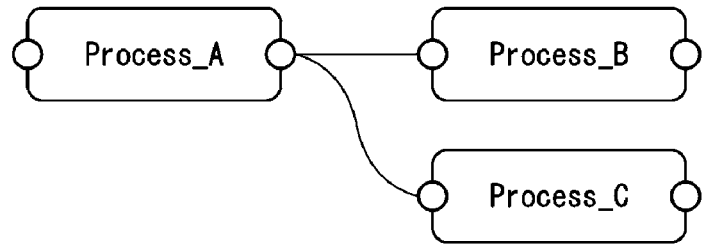
FIG. 4 is a diagram illustrating an example of operations of the adapting processing according to the first embodiment.
Figure 4:
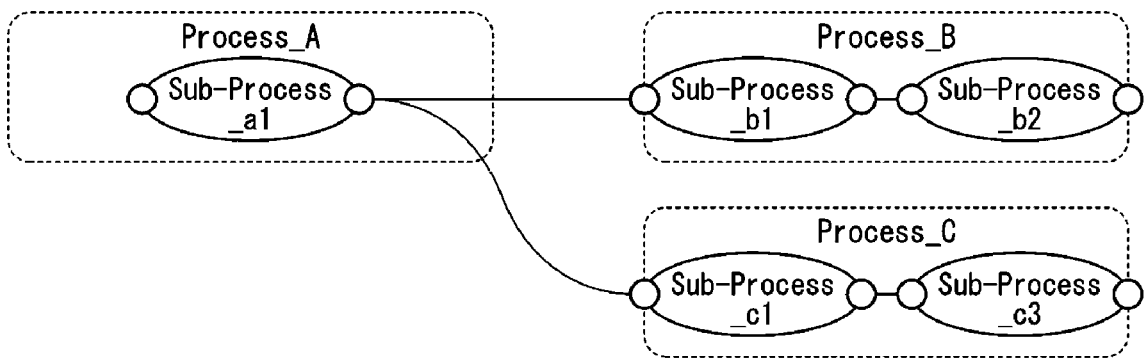
Figure 4:
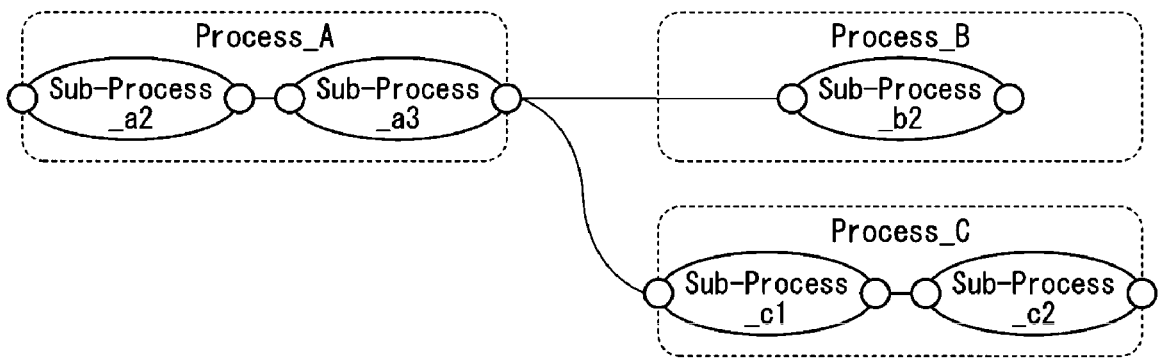
Figure 5:
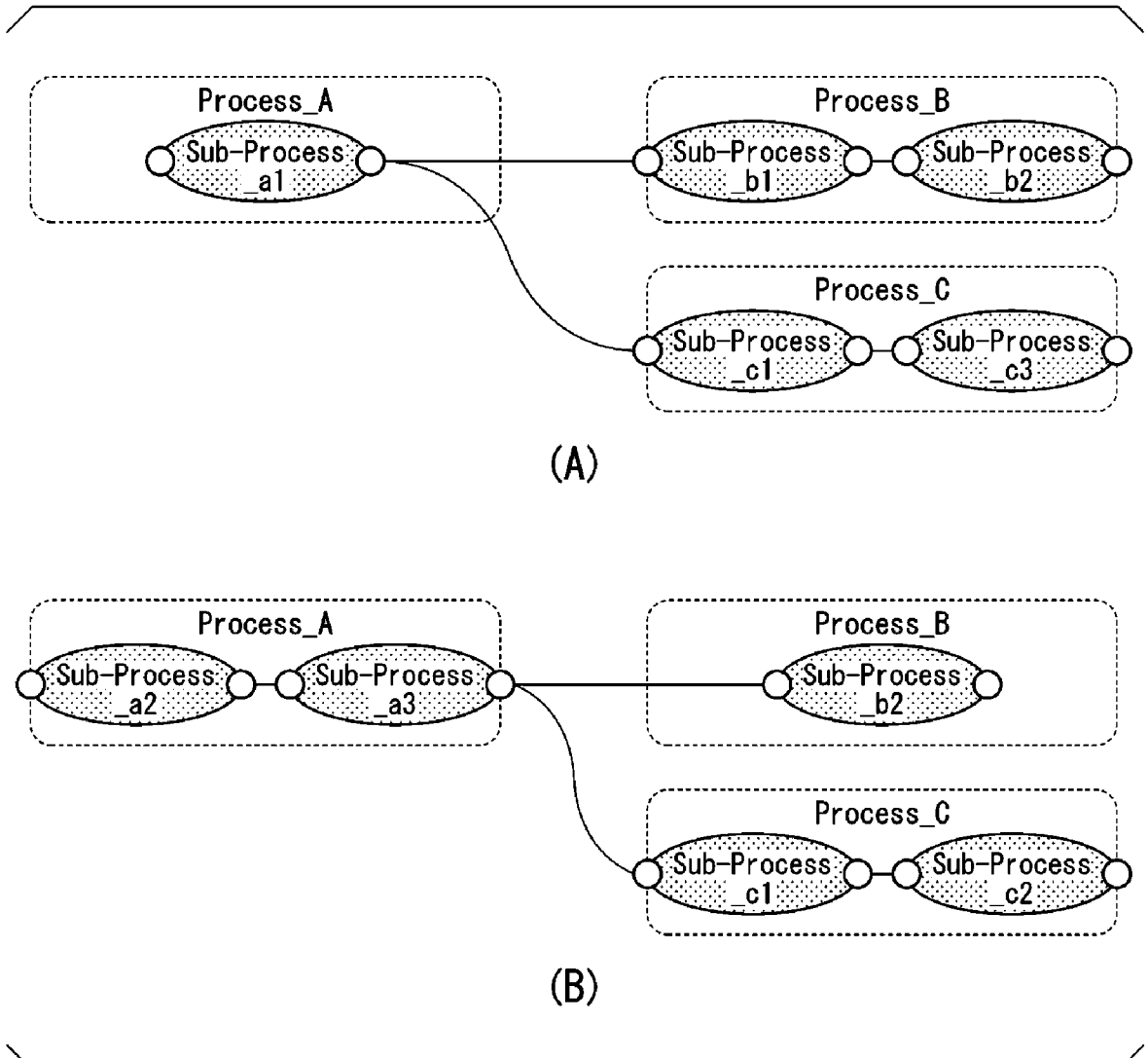
FIG. 5 is a diagram illustrating an example of operations of the adapting processing according to the first embodiment.

FIG. 3 is a flowchart illustrating a specific example of processing in which the adapting device 1 according to the first embodiment converts a request from the higher-level system into a request for the lower-level system (hereinafter referred to as "adapting processing"). FIGS. 4 and 5 are diagrams illustrating an example of operations of the adapting processing according to the first embodiment. Hereinafter, the flowchart of FIG. 3 will be described with appropriate reference to FIGS. 4 and 5.

First, the adapting functional unit 11 receives an abstracted rule from the higher-level system as an input (Step S101). For example, the adapting functional unit 11 receives an abstracted rule formed from Process_A, Process_B, and Process_C illustrated in FIG. 4(A) as an input. FIG. 4(A) illustrates an example of an abstracted rule for executing Process_B and Process_C in parallel after execution of Process_A.

Subsequently, the adapting functional unit 11 converts the input abstracted rule into a specific rule for a lower-level system (Step S102). For example, the adapting functional unit 11 acquires a combination of one or more corresponding sub-processes for each of three processes illustrated in FIG. 4(A) by referring to the conversion table 12.

For example, in a case where the abstracted rule illustrated in FIG. 4(A) is a request to the network device NE_a, and the conversion table 12 is configured as illustrated in FIG. 2(A), the adapting functional unit 11 acquires Sub_Process_a1 as a sub-process corresponding to Process_A. In addition, in this case, the adapting functional unit 11 acquires a combination of two sub-processes to be executed in order of Sub_Process_b1 and Sub_Process_b2 as sub-processes corresponding to Process_B. Furthermore, in this case, the adapting functional unit 11 acquires a combination of two sub-processes to be executed in order of Sub_Process_c1 and Sub_Process_c3 as sub-processes corresponding to Process_C.

The adapting functional unit 11 converts (adapts) an abstracted rule into a specific rule by replacing a process with the combination of one or more corresponding sub-processes acquired in this way. For example, in a case where the abstracted rule illustrated in FIG. 4(A) is a request to the network device NE_a, and the conversion table 12 is configured as illustrated in FIG. 2(A), the abstracted rule illustrated in FIG. 4(A) is adapted into a specific rule illustrated in FIG. 4(B). In addition, for example, in a case where the abstracted rule illustrated in FIG. 4(A) is a request to the network device NE_d, and the conversion table 12 is configured as illustrated in FIG. 2(A), the abstracted rule illustrated in FIG. 4(A) is adapted into a specific rule illustrated in FIG. 4(C).

Subsequently, the adapting functional unit 11 generates a processing program that enables the lower-level system to execute the converted specific rule (Step S103). Specifically, the adapting functional unit 11 acquires a sub-program corresponding to each sub-process configuring the specific rule from the database 13 and generates a processing program by combining the acquired sub-program with the specific rule.

For example, by combining the sub-program of each sub-process with the specific rule illustrated in FIG. 4(B), a processing program illustrated in FIG. 5(A) is generated. In addition, for example, by combining the sub-program of each sub-process with the specific rule illustrated in FIG. 4(C), a processing program illustrated in FIG. 5(B) is generated. The adapting functional unit 11 supplies the processing program generated in this way to the lower-level system (Step S104).

The adapting device 1 according to the first embodiment configured in this way includes the adapting functional unit 11 that converts an abstracted rule input from the higher-level system into a specific rule for the lower-level system, and thus an operation of the lower-level network device can be dynamically changed in accordance with the request from the higher-level system.

In addition, the adapting device 1 according to the first embodiment includes the database 13 of sub-programs that are necessary for generation of a processing program, and the adapting functional unit 11 generates a processing program by combining required sub-programs in accordance with a specific rule acquired by adapting an abstracted rule. Such a configuration allows the adapting device 1, which is separate from higher-level and lower-level systems, to centrally manage a configuration relating to adaptation of a request.

Modified Example

The processing of generating a processing program by combining a sub-program with a specific rule may be performed by the lower-level system. In such a case, the adapting device 1 may supply the specific rule and the sub-program to the lower-level system without generating a processing program.

In a case where the lower-level system stores a sub-program, the processing program may be generated by the lower-level system. In such a case, the adapting device 1 may supply only the specific rule to the lower-level system without generating the processing program. In addition, in such a case, the adapting device 1 may be configured as a device not including the database 13.

Second Embodiment

An adapting device 1 according to a second embodiment basically has a configuration that is similar to the configuration of the adapting device 1 according to the first embodiment illustrated in FIG. 1 but is different in that operations of an adapting functional unit 11 are partly different. Specifically, in the second embodiment, the adapting functional unit 11 supplies a specific rule and a sub-program that is required in a lower-level system without generating a processing program.

Figure 6:
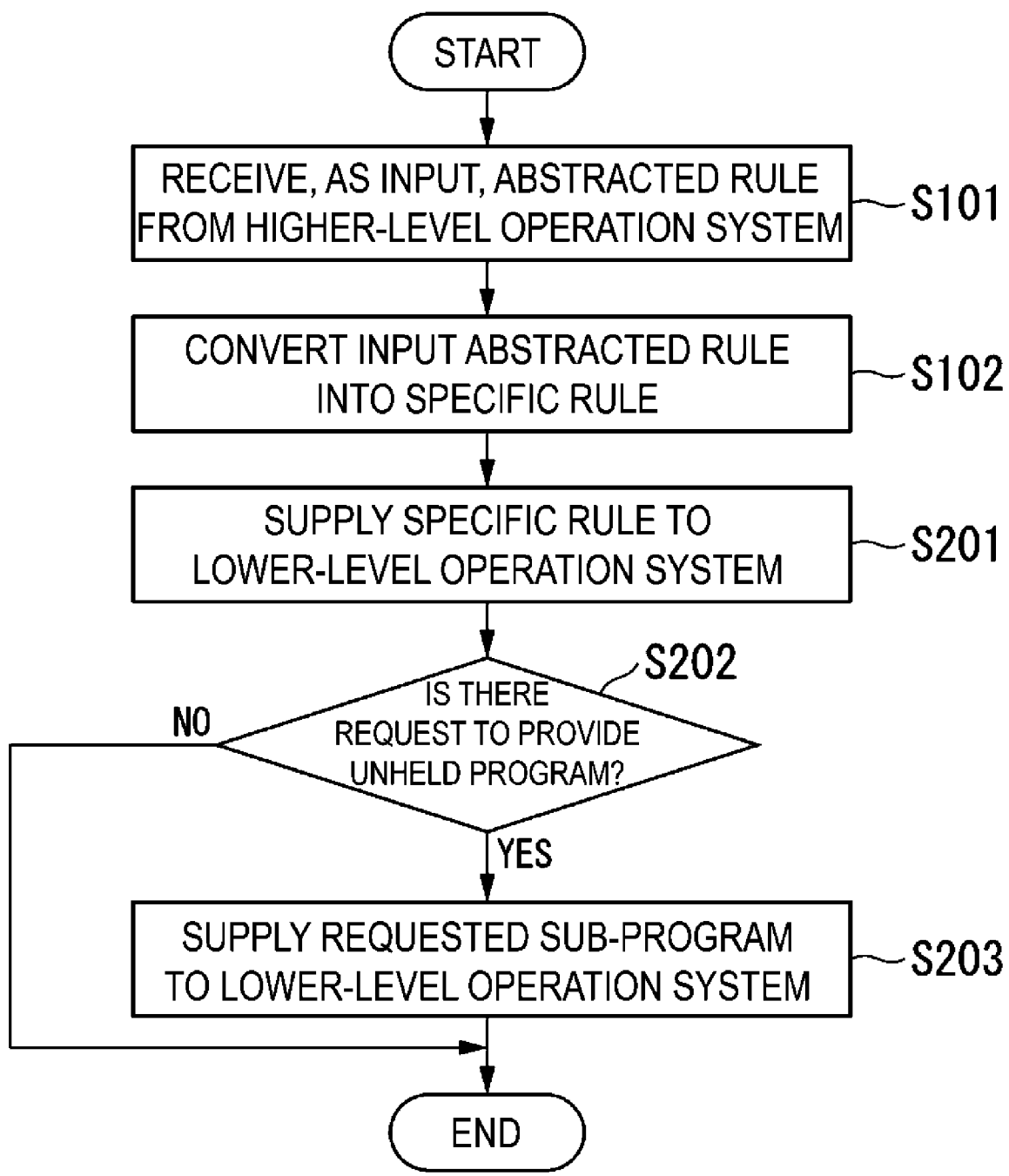
FIG. 6 is a flowchart illustrating a specific example of adapting processing according to a second embodiment.
Figure 7:
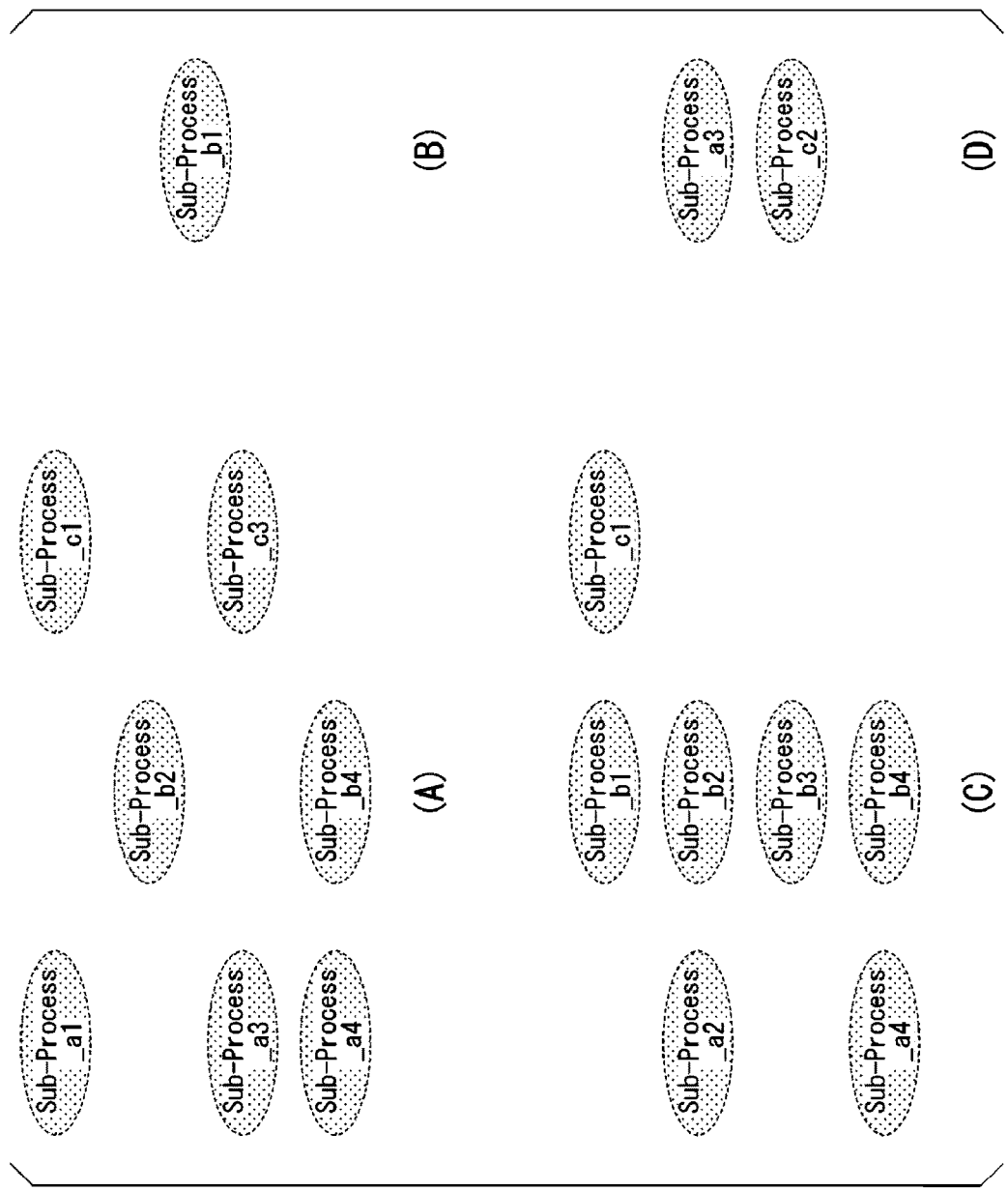
FIG. 7 is a diagram illustrating an example of operations of the adapting processing according to the second embodiment.

FIG. 6 is a flowchart illustrating a specific example of adapting processing according to the second embodiment. FIG. 7 is a diagram illustrating an example of operations of the adapting processing according to the second embodiment. Hereinafter, the flowchart illustrated in FIG. 6 will be described with appropriate reference to FIGS. 7 and 8. In FIG. 6, the same reference signs as those illustrated in FIG. 3 are assigned to processing operations similar to those of the first embodiment, and description thereof will be omitted here.

The adapting functional unit 11 supplies the specific rule acquired in Step S102 to the lower-level system (Step S201). In accordance with this, the lower-level system identifies a sub-program that is not held thereby among sub-programs required for generating a processing program (hereinafter referred to as an "unheld program") based on the specific rule input from the adapting functional unit 11. The lower-level system requests the adapting device 1 to provide the identified unheld program.

Meanwhile, after supplying the specific rule (Step S201), the adapting functional unit 11 determines whether or not it has been requested to provide the unheld program from the lower-level system (Step S202). In a case where the request for providing the unheld program has not been received (Step S202, No), the adapting functional unit 11 ends the adapting processing. On the other hand, in a case where the request for providing the unheld program has been received (Step S202, Yes), the adapting functional unit 11 acquires the requested sub-program from the database 13 and supplies the acquired sub-program to the lower-level system that is a request source (Step S203).

For example, FIG. 7(A) illustrates a specific example of sub-programs that are held by the network device NE_a when adaptation similar to that of the cases illustrated in FIGS. 2 and 4 is performed. In this case, in order for the network device NE_a to generate a processing program of a specific rule illustrated in FIG. 4(B), the network device NE_a requires a sub-program corresponding to Sub_Process_b1 (hereinafter referred to as a "Sub-Program_b1"; the same also applies to the other sub-programs) in addition to the sub-programs that have already been held by the network device NE_a (FIG. 7(B)). In other words, in this case, Sub-Program_b1 is an unheld program, and thus the network device NE_a requests the adapting device 1 to provide Sub-Program_b1. The network device NE_a generates a processing program using Sub-Program_b1 supplied from the adapting device 1 and the sub-programs that have been held originally.

Similarly, for example, FIG. 7(C) illustrates a specific example of sub-programs that are held by the network device NE_d when adaptation similar to that of the cases illustrated in FIGS. 2 and 4 is performed. In this case, in order to generate a processing program of a specific rule illustrated in FIG. 4(C), the network device NE_d requires Sub-Program_a3 and Sub-Program_c2 in addition to the sub-programs that have already been held by the network device NE_d (FIG. 7(D)). In other words, in this case, Sub-Program_a3 and Sub-Program_c2 are unheld programs, and thus the network device NE_d requests the adapting device 1 to provide Sub-Program_a3 and Sub-Program_c2. The network device NE_d generates a processing program using Sub-Program_a3 and Sub-Program_c2 supplied from the adapting device 1 and the sub-programs that have been held originally.

The adapting device 1 according to the second embodiment configured in this way supplies sub-programs in accordance with a request from the lower-level system and thus can inhibit an increase in the amount of communication caused by adapting the request.

Modified Example

Figure 8:
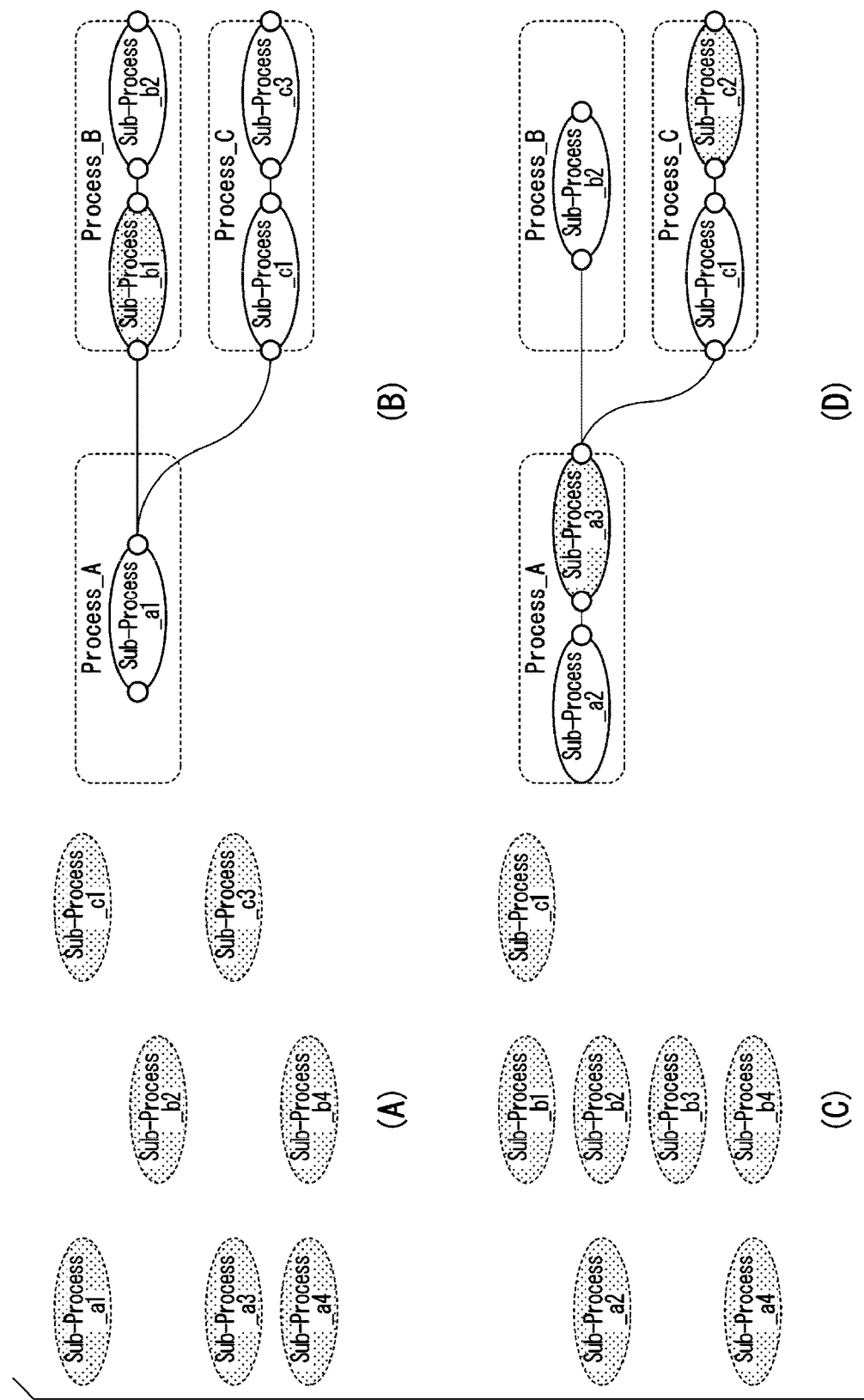
FIG. 8 is a diagram illustrating an example of operations of an adapting functional unit according to a modified example of the second embodiment.

The adapting functional unit 11 may be configured to supply only a sub-program that has not been provided to the lower-level system instead of supplying sub-programs in accordance with a request from the lower-level system. Specifically, the adapting functional unit 11 records a provision history representing a sub-program and a provision destination thereof every time the adapting processing is performed. When a new adapting request is generated, the adapting functional unit 11 identifies a sub-program that has not been provided by referring to the provision history and supplies a processing program acquired by combining a specific rule with only the sub-program that has not been provided (hereinafter referred to as a "partial processing program") to the lower-level system. FIG. 8 is a diagram illustrating an example of operations of the adapting functional unit 11 of this modified example.

For example, FIG. 8(A) illustrates specific examples of sub-programs that have already been provided to the network device NE_a when adaptation similar to that of the case illustrated in FIGS. 2 and 4 is performed. In this case, in order for the network device NE_a to generate a processing program of the specific rule illustrated in FIG. 4(B), Sub-Program_b1 is required in addition to the sub-programs that have already been provided. In other words, in this case, Sub-Program_b1 has not been provided, and thus the adapting functional unit 11 generates a partial processing program acquired by combining only Sub-Program_b1 and supplies the generated partial processing program to the network device NE_a (FIG. 8(B)).

Similarly, for example, FIG. 8(C) illustrates specific examples of sub-programs that have already been provided to the network device NE_d when adaptation similar to that of the case illustrated in FIGS. 2 and 4 is performed. In this case, in order for the network device NE_d to generate a processing program of the specific rule illustrated in FIG. 4(C), Sub-Program_a3 and Sub-Program_c2 are required in addition to the sub-programs that have already been provided. In other words, in this case, Sub-Program_a3 and Sub-Program_c2 have not been provided, and thus the adapting functional unit 11 generates a partial processing program acquired by combining only Sub-Program_a3 and Sub-Program_c2 and supplies the generated partial processing program to the network device NE_a (FIG. 8(D)).

The adapting device 1 of the modified example configured in this way supplies only sub-programs that have not been provided, similar to the adapting device 1 according to the second embodiment, which can inhibit an increase in the amount of communication caused by adapting the request.

Third Embodiment

Figure 9:
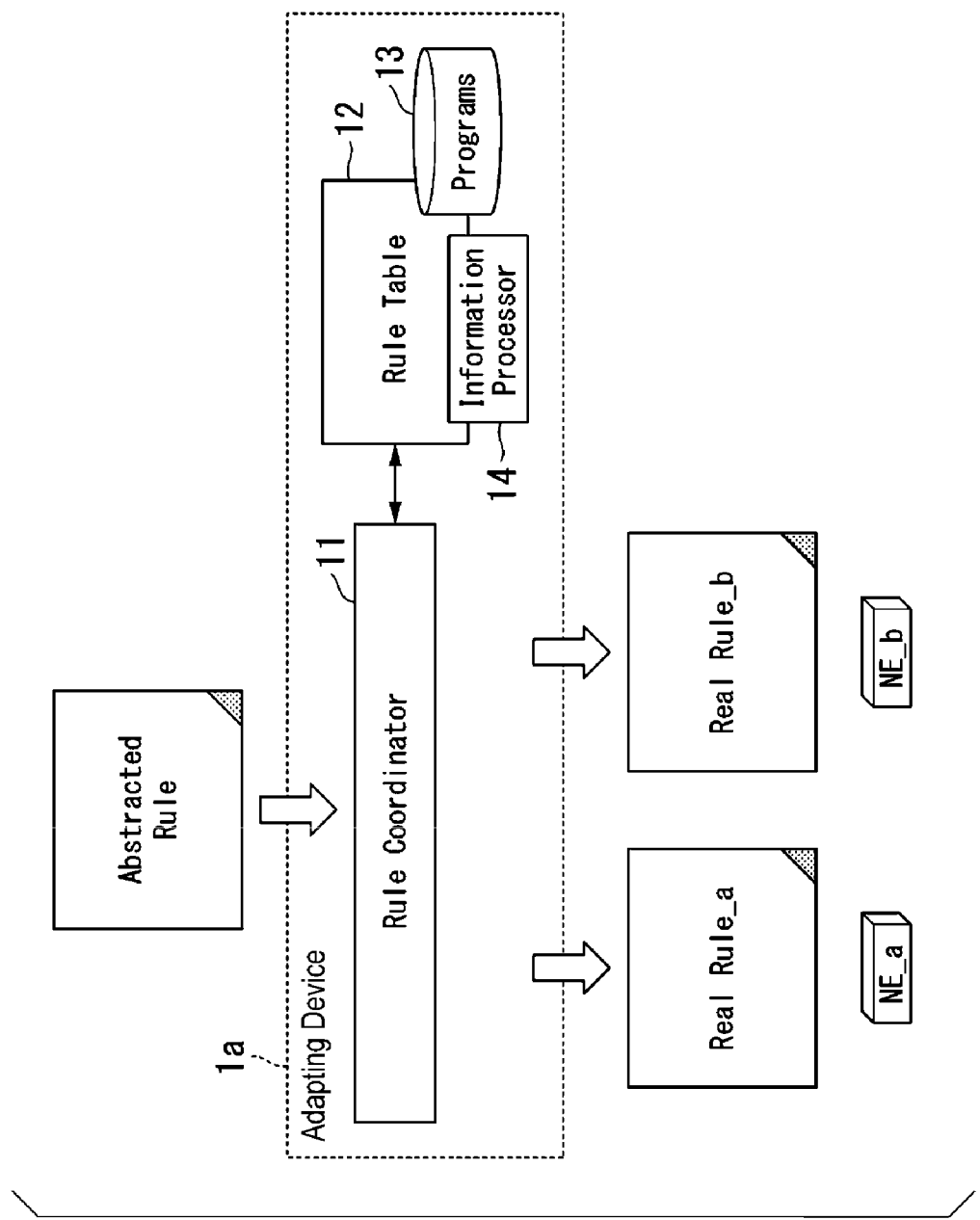
FIG. 9 is a diagram illustrating a specific example of an adapting device according to a third embodiment.

FIG. 9 is a diagram illustrating a specific example of an adapting device according to a third embodiment. An adapting device 1a illustrated in FIG. 9 includes an adapting functional unit 11a instead of the adapting functional unit 11 and further includes an additional information processing unit 14, which is different from the adapting device 1 according to the first embodiment. In FIG. 9, the same reference signs as those illustrated in FIG. 1 are assigned to functional units that are similar to those of the adapting device 1 according to the first embodiment, and description thereof will be omitted here.

The additional information processing unit 14 (information processor) has a function of generating additional information relating to a relationship between a higher-level system and a lower-level system.

The adapting functional unit 11a converts an abstracted rule into a specific rule and supplies the specific rule to the lower-level system, which is similar to the adapting functional unit 11 according to the first embodiment. However, the adapting functional unit 11a can add additional information to information to be supplied to the lower-level system as is necessary, which is different from the adapting functional unit 11 according to the first embodiment. Here, for example, the additional information means a specific rule, a processing program, or a partial processing program. Hereinafter, these will be collectively referred to as "supply information".

Figure 10:
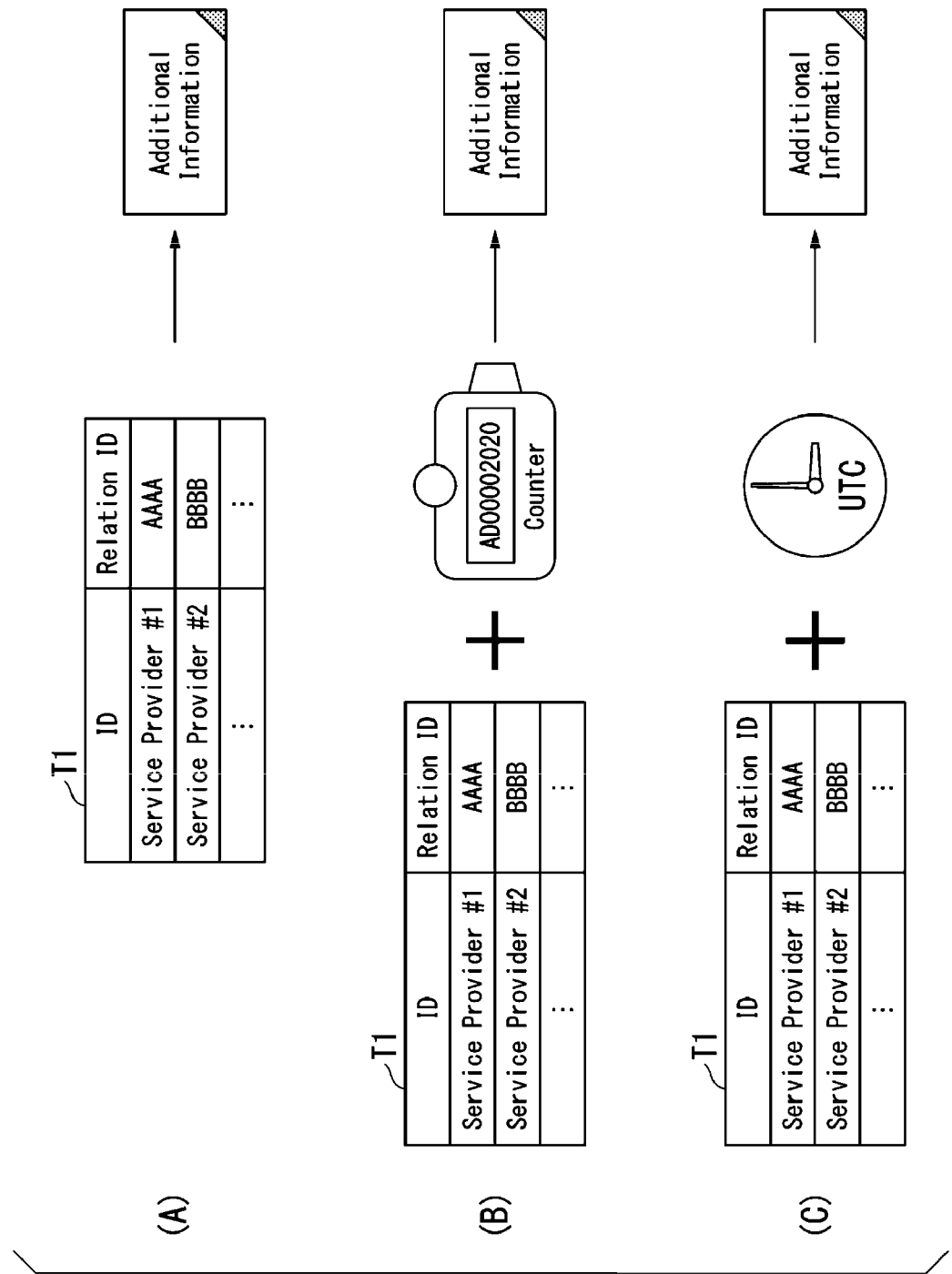
FIG. 10 is a diagram illustrating a specific example of additional information according to the third embodiment.

FIG. 10 is a diagram illustrating a specific example of the additional information according to the third embodiment. For example, FIG. 10(A) illustrates an example in which relation information (relation ID) representing a relationship with the higher-level system (for example, service provider) is generated as additional information. In this case, for example, the relation information (relation ID) is stored in the adapting device 1a in advance as a relation information table T1 representing a correspondence relation with identification information (ID) of the higher-level system. The additional information processing unit 14 acquires relation information associated with an operation system of a request source (higher-ranked operation system) from the relation information table T1 and outputs the acquired relation information to the adapting functional unit 11a.

The relation information may be registered in the relation information table T1 in advance or may be automatically registered in the relation information table T1 in accordance with a request for adaptation from the higher-level system. For example, upon receipt of a request for adaptation from a new service provider, the adapting device 1a may generate unique relation information (relation ID) for each service provider and register the generated relation information in the relation information table T1.

In addition, for example, FIG. 10(B) illustrates an example in which the additional information processing unit 14 generates a serial number (counter) representing an order of supplying the supply information as additional information in addition to the relation information. Furthermore, for example, FIG. 10(C) illustrates an example in which the additional information processing unit 14 generates a time stamp relating to supply information as additional information in addition to the relation information. Both the serial number and the time stamp may be added to the supply information as additional information in addition to the relation information. In order to more accurately identify a state in which a request is applied (implemented), a coordinated universal time (UTC), a Unix time, or the like may be used as date and time information.

The serial number and the time stamp described above are examples of information relating to a timing of supplying a processing procedure according to the present invention. The processing procedure according to the present invention may be a specific rule or may be a processing program or a partial processing program acquired by combining a sub-program with a specific rule.

The adapting device 1a according to the third embodiment configured in this way can add additional information relating to a relationship between the higher-level system and the lower-level system to the supply information for the lower-level system. For this reason, according to the adapting device 1a of the third embodiment, a state in which an adapted request is applied (implemented) can be identified from the higher-level system.

Specifically, when the lower-level system makes a notification regarding received adapting information to the higher-level system, which is a transmission source, the adapting device 1a can identify the higher-level system to which the notification is made using the following method. Here, it is assumed that the lower-level system adds additional information received together with the adapting information to notification information and transmits the notification information to the adapting device 1a. For this reason, such a notification is performed at an appropriate timing (for example, at the time of receiving adapting information, at the time of generating a processing program, at the time of executing a processing program, and the like), the processing state of the adapting information in the lower-level system can be monitored from the higher-level system. In a case where such monitoring can be performed, when a status in which a notification is not arrived from the lower-level system continues for a predetermined time, it is determined that the status is caused by network disconnection due to a malfunction of the device, and the network disconnection can be detected.

Modified Example

Figure 11:
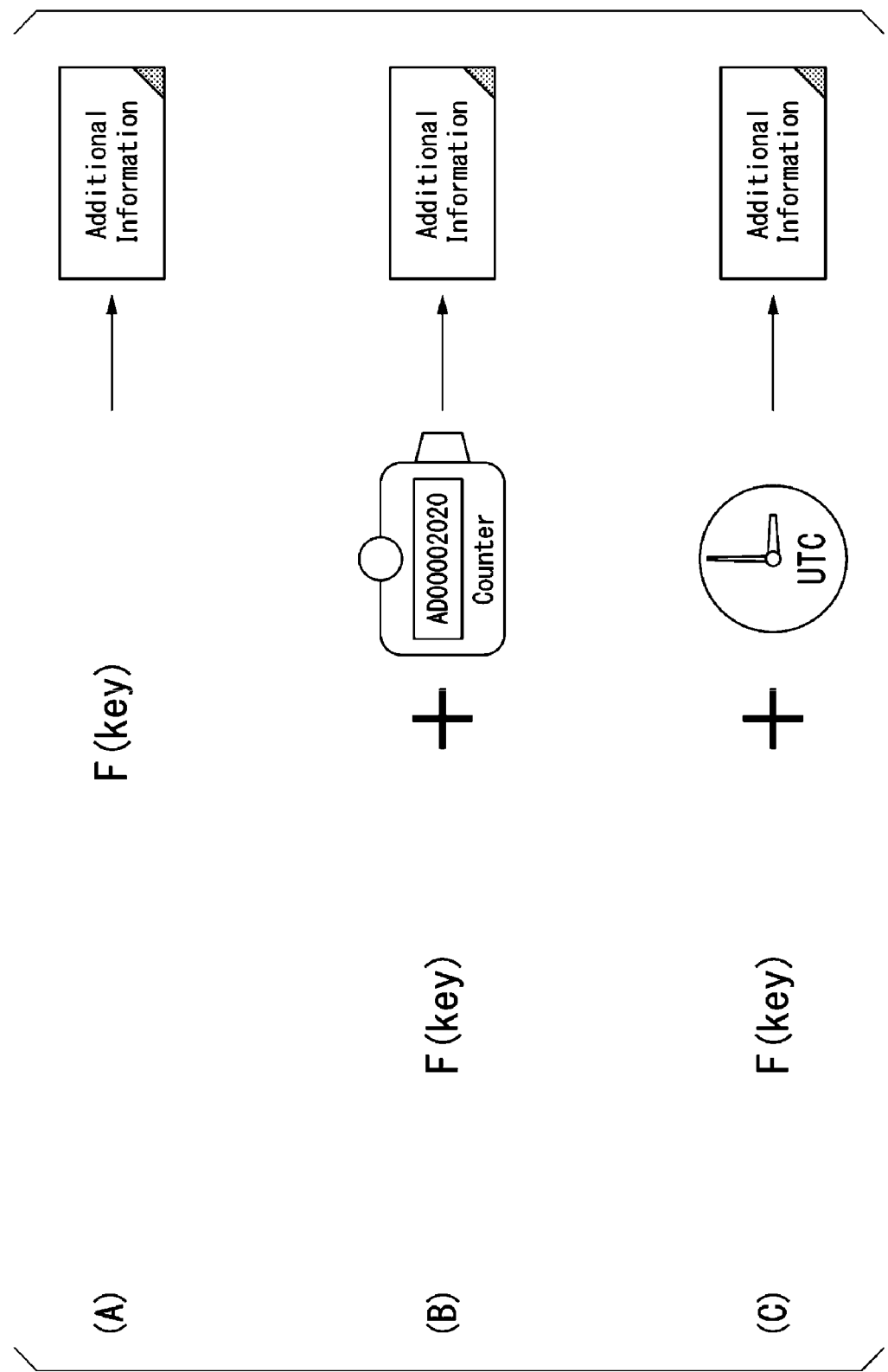
FIG. 11 is a diagram illustrating a specific example of additional information according to a modified example of the third embodiment.
Figure 12:
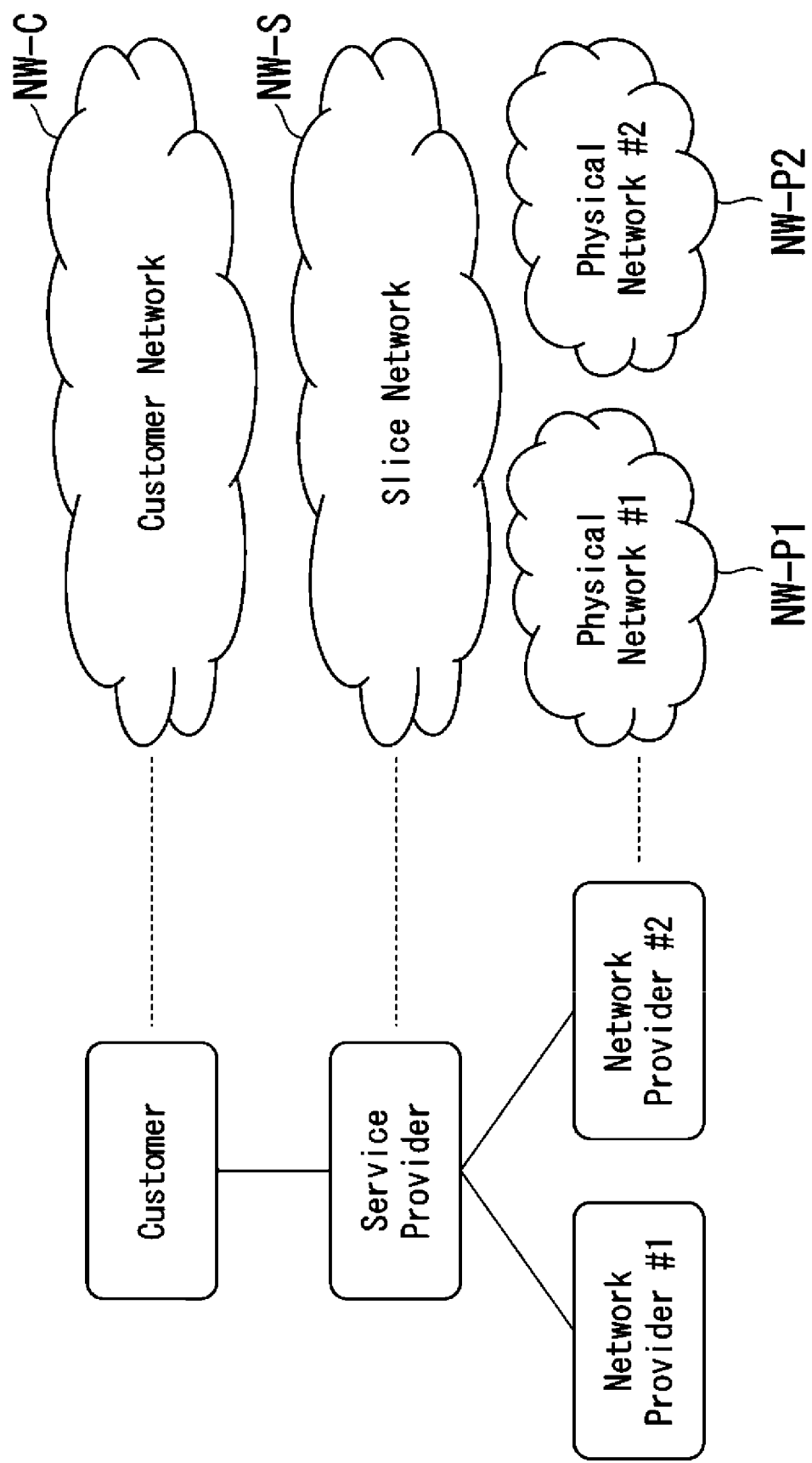
FIG. 12 is a diagram illustrating the related art.
Figure 13:
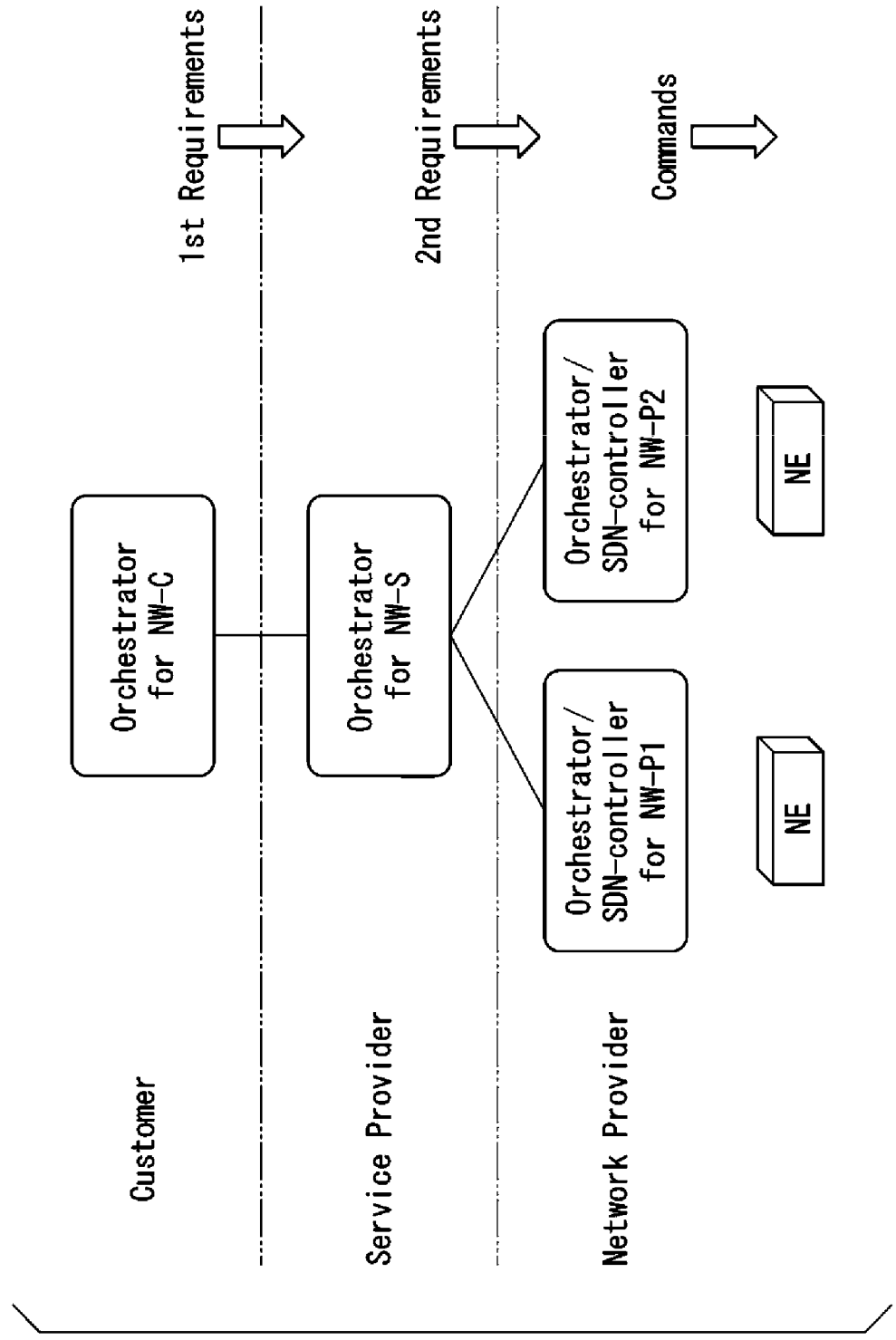
FIG. 13 is a diagram illustrating the related art.

The additional information processing unit 14 may generate relation information using a key and an algorithm (F) instead of using the relation information table T1. FIG. 11 is a diagram illustrating a specific example of additional information in such a modified example. FIG. 11(A) illustrates an example in which relation information F(key) that is an output of an algorithm is directly set as additional information. Here, for example, a hash function such as Message Digest Algorithm (MD5), Secure Hash Algorithm 1 (SHA1), or Secure Hash Algorithm 2 (SHA2) may be used. For example, as the key, one or more of pieces of various kinds of information described below or information acquired by combining such pieces of information may be used.

(1) Relation information (relation ID), the serial number, and the time stamp according to the third embodiment
(2) Random value generated using some or all of the information of (1)

(3) Encrypted relation information (relation ID)
(4) Relation information (relation ID) to which Cyclic Redundancy Check (CRC) is added In addition to these, as a key used at the time of generating relation information, any information relating to adaptation of a request may be used, and, similar to the third embodiment, additional information may be acquired by adding a serial number or a time stamp relating to supply information to the relation information F(key) may be used (FIGS. 11(B) and 11(C)).

The adapting device 1a of the modified example configured in this way supplies not the relation information itself, but hashed relation information to the lower-level system and thus can supply relation information to the lower-level system while concealing details thereof. In accordance with this, effects similar to those of the third embodiment can be acquired with the security of the higher-level system improved.

Some or all of the functions implemented by the adapting device according to each of the embodiments described above may be implemented by executing a program. This program may be executed by a physical machine or may be executed by a virtual machine configured on a memory of a physical machine. For example, the adapting device may be configured as a so-called cloud server that provides functions thereof as services through a network.

All or a part of the adapting device according to the embodiment described above may be implemented by a computer. In such a case, it may be implemented by recording a program for implementing these functions in a computer-readable recording medium, causing a computer system to read the program recorded in the recording medium, and executing the program. Note that the "computer system" as used herein includes an OS and hardware such as a peripheral device. The "computer-readable recording medium" refers to a portable medium such as a flexible disk, a magneto-optical disk, a ROM, and a CD-ROM, and a storage device such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is a volatile memory inside a computer system that functions as a server or a client in the above-described case. The above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

The embodiments of the present invention have been described above in detail with reference to the drawings. However, specific configurations are not limited to those embodiments, and include any design or the like within the scope not departing from the gist of the present invention.

INDUSTRIAL APPLICABILITY

The present invention can be applied to a network system in which an operation of a lower-level system is changed from a higher-level system.

REFERENCE SIGNS LIST 1, 1a Adapting device
11, 11a Adapting functional unit
12 Conversion table
13 Database
14 Additional information processing unit

The invention claimed is:
1. An adapting device comprising:
a first storage unit configured to store correspondence information representing a correspondence relation between processing requested by a higher-level system and a method for implementing the processing in a lower-level system;
a processor; and
a storage medium having computer program instructions stored thereon, when executed by the processor, perform to:
convert a processing request from the higher-level system to the lower-level system into a processing procedure capable of being implemented in the lower-level system and supply the processing procedure to the lower-level system; and
generate additional information to be supplied to the lower-level system together with the processing procedure,
wherein the processing request is converted into the processing procedure based on the correspondence information, and
the additional information includes relation information representing a relationship between the higher-level system that is a request source and the lower-level system that is a request destination.

2. The adapting device according to claim 1, further comprising:
a second storage unit configured to store a program for implementing the processing procedure in the lower-level system,
wherein the computer program instructions further perform to combines the program corresponding to the processing procedure and supplies the resultant processing procedure to the lower-level system.

3. The adapting device according to claim 1, further comprising:
a second storage unit configured to store a program for implementing the processing procedure in the lower-level system,
wherein the computer program instructions further perform to supplies the program corresponding to the processing procedure to the lower-level system in accordance with a request from the lower-level system.

4. The adapting device according to claim 1, further comprising:
a second storage unit configured to store a program for implementing the processing procedure in the lower-level system,
wherein the computer program instructions further perform to combines, among a plurality of the programs corresponding to the processing procedure, only a program that has not been provided to the lower-level system with the processing procedure and supplies the resultant processing procedure to the lower-level system.

5. The adapting device according to claim 1, wherein the computer program instructions further perform to acquires the relation information based on information representing a correspondence relation between the higher-level system and relation information relating to the higher-level system.

6. The adapting device according to claim 1, wherein the computer program instructions further perform to acquires the relation information based on a predetermined algorithm using, as an input, information relating to the request.

7. The adapting device according to claim 1, wherein the additional information includes the relation information and information relating to a timing of supplying the processing procedure.

8. The adapting device according to claim 6, wherein the algorithm is a hash function using, as an input, identification information of the higher-level system, information relating to a timing of supplying the processing procedure, or information generated based on the identification information and the information relating to the timing.

* * * * *